United States Patent
Nagasawa

(10) Patent No.: US 12,454,219 B2
(45) Date of Patent: Oct. 28, 2025

(54) IN-VEHICLE DEVICE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 33 days.

(21) Appl. No.: 18/610,120

(22) Filed: Mar. 19, 2024

(65) Prior Publication Data

US 2024/0326689 A1  Oct. 3, 2024

(30) Foreign Application Priority Data

Mar. 28, 2023  (JP) ................. 2023-051634

(51) Int. Cl.
*G08B 21/00* (2006.01)
*B60N 2/00* (2006.01)
*B60Q 9/00* (2006.01)

(52) U.S. Cl.
CPC ........... *B60Q 9/002* (2013.01); *B60N 2/0035* (2023.08)

(58) Field of Classification Search
CPC .......... B60Q 9/002; B60Q 1/00; B60Q 1/544; B60Q 5/005; B60N 2/0035; B60N 2210/30; B60N 2230/20; B60N 2/0025; B60N 2/267; G08B 21/02; B60R 16/0232; B60R 21/015; B60R 21/01512; B60R 21/01538; B60R 21/01554; B60R 21/01556; B60R 2021/006; B60R 2021/0104; B60R 2021/01252; B60R 2021/01286

USPC .......................................... 340/457
See application file for complete search history.

(56) References Cited

U.S. PATENT DOCUMENTS

| | | | |
|---|---|---|---|
| 2007/0052529 A1* | 3/2007 | Perez ................ | B60N 2/003 340/457 |
| 2016/0042624 A1* | 2/2016 | Quave ............... | B60N 2/0025 340/457 |
| 2017/0116839 A1* | 4/2017 | Friedman .......... | G08B 21/0269 |
| 2020/0189462 A1* | 6/2020 | Shimizu ............. | B60Q 9/008 |
| 2022/0114817 A1* | 4/2022 | Gronau .............. | G06V 40/10 |

FOREIGN PATENT DOCUMENTS

JP    2020-093684 A    6/2020

* cited by examiner

Primary Examiner — Mark S Rushing
(74) Attorney, Agent, or Firm — Rimon P.C.

(57) ABSTRACT

An in-vehicle device includes: a parking state detector configured to detect a parking state of a vehicle; a vehicle cabin situation detector configured to detect a situation in a vehicle cabin of the vehicle; a child information detector configured to detect presence of a child and position information on the child in the vehicle cabin based on a signal from a sensor provided on a child seat in the vehicle cabin; a temperature information acquisition unit configured to acquire temperature information in the vehicle cabin; a notification unit configured to, when the child is left in the vehicle cabin, notify outside of the vehicle that leaving of the child has occurred; and a controller configured to, when the vehicle is in the parking state, control a notification mode of the notification unit according to information including the temperature information in the vehicle cabin.

5 Claims, 8 Drawing Sheets

IN-VEHICLE DEVICE

CROSS-REFERENCE TO RELATED APPLICATIONS

The present application claims priority from Japanese Patent Application No. 2023-051634 filed on Mar. 28, 2023, the entire contents of which are hereby incorporated by reference.

BACKGROUND

The disclosure relates to an in-vehicle device.

Related Art

In recent years, many cases where a child or the like is left in a parked vehicle to cause an accident have been reported, and these accidents have become a social problem.

In particular, in summer in which an influence of unusual weather is intense, when a child or the like is left in the parked vehicle, there is a high possibility of causing a serious situation regardless of day and night.

In order to cope with such an event, there is disclosed an in-vehicle accident prevention device including: an occupant detector that detects an occupant inside a vehicle; an abnormality detector that detects an abnormality in the vehicle; and a controller that controls a warning device to warn an inside or an outside of the vehicle or controls in-vehicle equipment to mitigate the abnormality in the vehicle when the occupant detector detects the occupant and the abnormality detector detects the abnormality, in which the occupant detector extracts physical characteristics or behavioral characteristics of the occupant in the vehicle to further detect a type of the occupant or whether the occupant is able to cope with the abnormality, and the controller executes the warning by the warning device or the abnormality mitigation by the in-vehicle equipment according to the type or a state of the occupant detected by the occupant detector (for example, refer to Japanese Unexamined Patent Application Publication (JP-A) No. 2020-93684).

SUMMARY

An aspect of the disclosure provides an in-vehicle device. The in-vehicle device includes a parking state detector, a vehicle cabin situation detector, a child information detector, a temperature information acquisition unit, a notification unit, and a controller. The parking state detector is configured to detect a parking state of a vehicle. The vehicle cabin situation detector is configured to detect a situation in a vehicle cabin of the vehicle. The child information detector is configured to detect presence of a child and position information on the child in the vehicle cabin based on a signal from a seat sensor provided on a child seat in the vehicle cabin. The temperature information acquisition unit is configured to acquire temperature information in the vehicle cabin. The notification unit is configured to, when the child is left in the vehicle cabin, notify outside of the vehicle that leaving of the child has occurred. The controller is configured to, when the vehicle is in the parking state, control a notification mode of the notification unit according to information including the temperature information in the vehicle cabin.

An aspect of the disclosure provides an in-vehicle device. The in-vehicle device includes one or more processors, and one or more memories communicably coupled to the one or more processors. The one or more processors are configured to detect a parking state of the vehicle, detect a situation in a vehicle cabin of the vehicle, detect presence of a child and position information on the child in the vehicle cabin based on a signal from a seat sensor provided on a child seat in the vehicle cabin, acquire temperature information in the vehicle cabin, cause a notification unit to notify, when the child is left in the vehicle cabin, the outside of the vehicle that leaving of the child has occurred, the notification unit being configured to notify outside of a vehicle including an emergency notification center of a warning, and control, when the vehicle is in the parking state, a notification mode of the notification unit according to information including the temperature information in the vehicle cabin.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

In the technique described in JP-A No. 2020-93684, the warning by the warning device or the abnormality mitigation by the in-vehicle equipment is executed according to the type or the state of the occupant detected by the occupant detector.

However, in the technique described in JP-A No. 2020-93684, when the occupant who is left in a parked vehicle is a child and a cloth or the like is put on a child seat, the child may not be detected from an image or the like in the first place.

Although not disclosed in JP-A No. 2020-93684, a delicate movement of the child may not be grasped even when sensing by a millimeter-wave radar or the like is used.

Furthermore, since the child may not be able to escape to the outside of the vehicle by himself or herself and is also inferior in physical strength, it is urgent to take a measure for the child left in the parked vehicle, but the technique described in JP-A No. 2020-93684 has a problem that the technique takes time to take an emergency response.

Therefore, it is desirable to provide an in-vehicle device that quickly discovers a child who is left in a parked vehicle, provides an immediate emergency response, and ensures safety of the child.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

An in-vehicle device 1 according to a first embodiment of the disclosure will be described with reference to FIGS. 1 to 4.

Configuration of In-Vehicle Device 1

Figure 1:
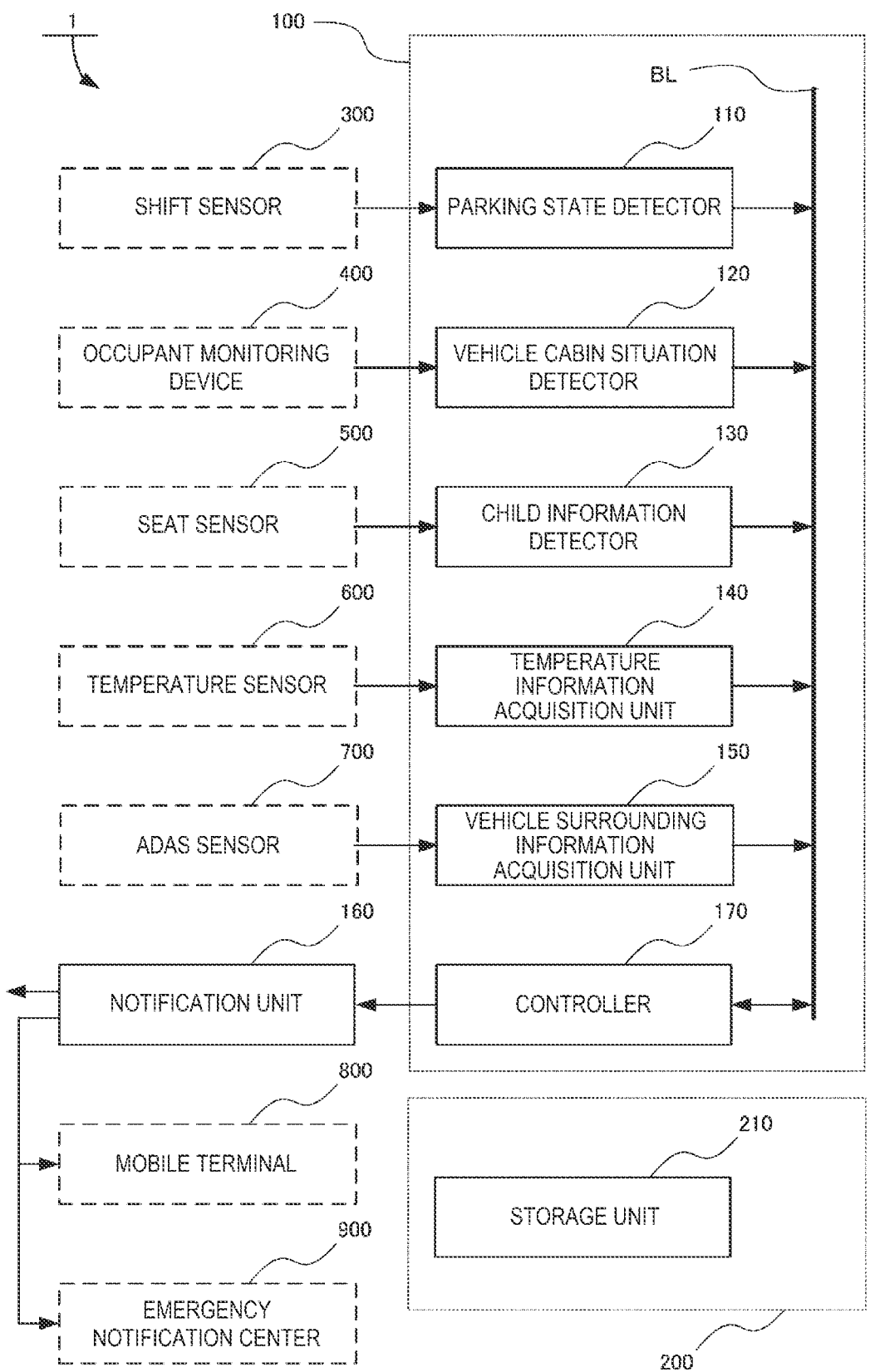
FIG. 1 is a diagram illustrating a configuration of an in-vehicle device according to an embodiment of the disclosure.

As illustrated in FIG. 1, the in-vehicle device 1 according to the present embodiment includes a processor 100 and a memory 200.

The processor 100 executes a process of accurately grasping presence of a child IF who is left in a vehicle cabin in a parked vehicle, providing an immediate emergency response, and ensuring safety of the child IF.

Details of each process will be described later.

The memory 200 includes a read only memory (ROM), a random access memory (RAM), or the like, and saves and stores a program and various data.

In the present embodiment, the memory 200 includes a storage unit 210 and saves and stores, for example, a control program and various detected or acquired data.

As illustrated in FIG. 1, the processor 100 of the in-vehicle device 1 according to the present embodiment includes a parking state detector 110, a vehicle cabin situation detector 120, a child information detector 130, a temperature information acquisition unit 140, a vehicle surrounding information acquisition unit 150, and a controller 170.

The parking state detector 110 detects a parking state of a vehicle.

For example, the parking state detector 110 detects whether the vehicle is in the parking state by detecting whether a shift position is a parking position based on a sensing signal from a shift sensor 300.

The parking state detector 110 outputs a detection result to the controller 170 to be described later via a bus line BL.

The vehicle cabin situation detector 120 detects a situation in the vehicle cabin.

For example, the vehicle cabin situation detector 120 detects an occupant in the vehicle cabin from image information of the vehicle cabin obtained from an occupant monitoring device 400.

The vehicle cabin situation detector 120 outputs a detection result to the controller 170 to be described later via the bus line BL.

The child information detector 130 detects the presence of the child and position information on the child in the vehicle cabin based on signals from seat sensors 500 provided on a child seat.

Figure 2:
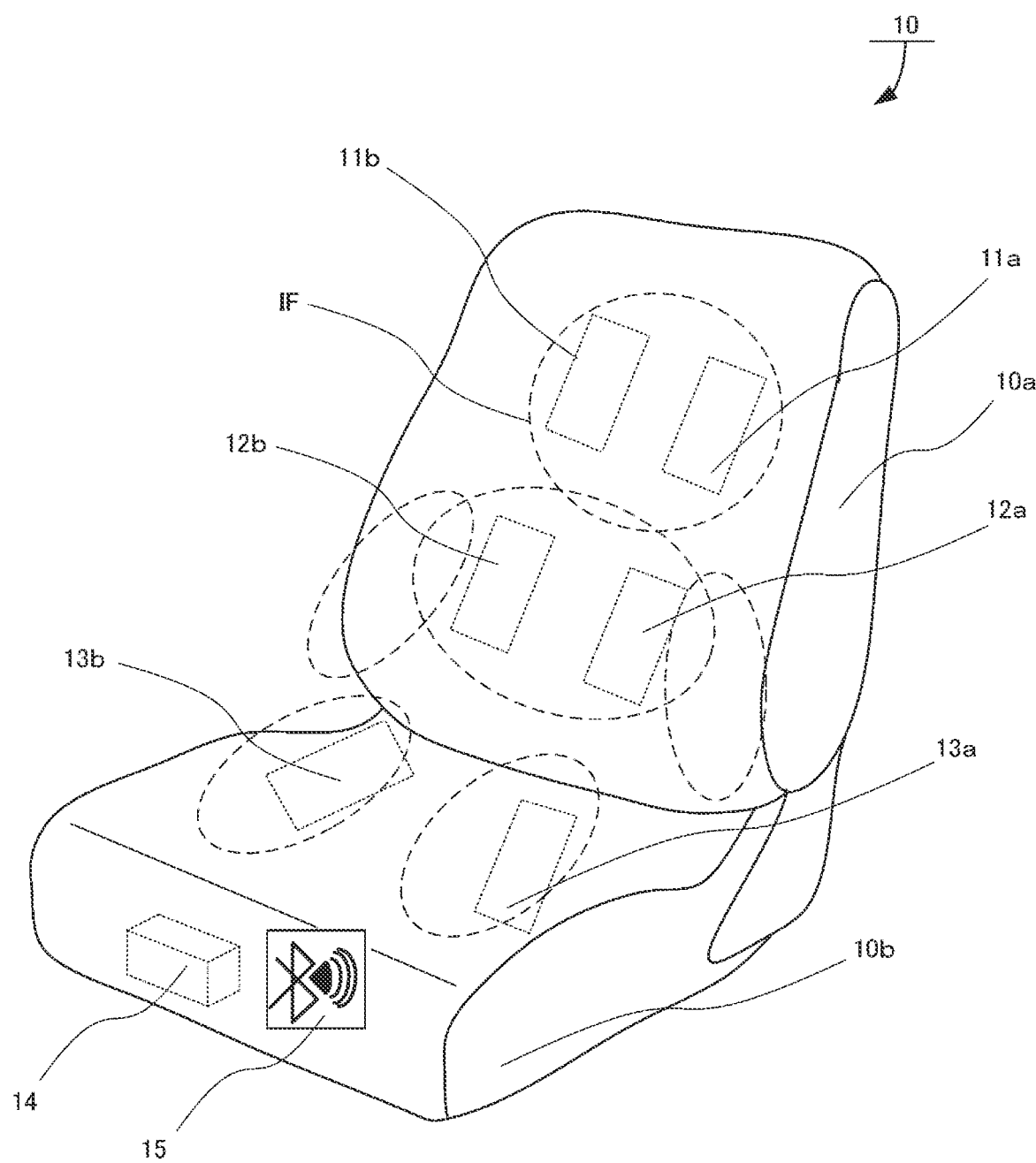
FIG. 2 is a view illustrating a configuration of a seat according to the first embodiment of the disclosure.

As illustrated in FIG. 2, the seat sensors 500 includes for example, head sensors 11a and 11b, chest sensors 12a and 12b, and ischium sensors 13a and 13b, which correspond to a head, a chest, and an ischium of a child IF in a state where the child IF is seated on a child seat 10.

The head sensors 11a and 11b, the chest sensors 12a and 12b, and the ischium sensors 13a and 13b are provided symmetrically on inner sides of a seat back 10a and a seating surface 10b of the child seat 10, which are in contact with the child IF.

Further, an ECU 14 and a short-distance wireless antenna 15 are provided inside the child seat 10, for example, the ECU 14 wirelessly transmits output signals from the head sensors 11a and 11b, the chest sensors 12a and 12b, and the ischium sensors 13a and 13b to a receiver (not illustrated) of the in-vehicle device 1 via the short-distance wireless antenna 15, and the receiver supplies the output signals from the head sensors 11a and 11b, the chest sensors 12a and 12b, and the ischium sensors 13a and 13b to the controller 170 to be described later via the bus line BL.

Figure 3:
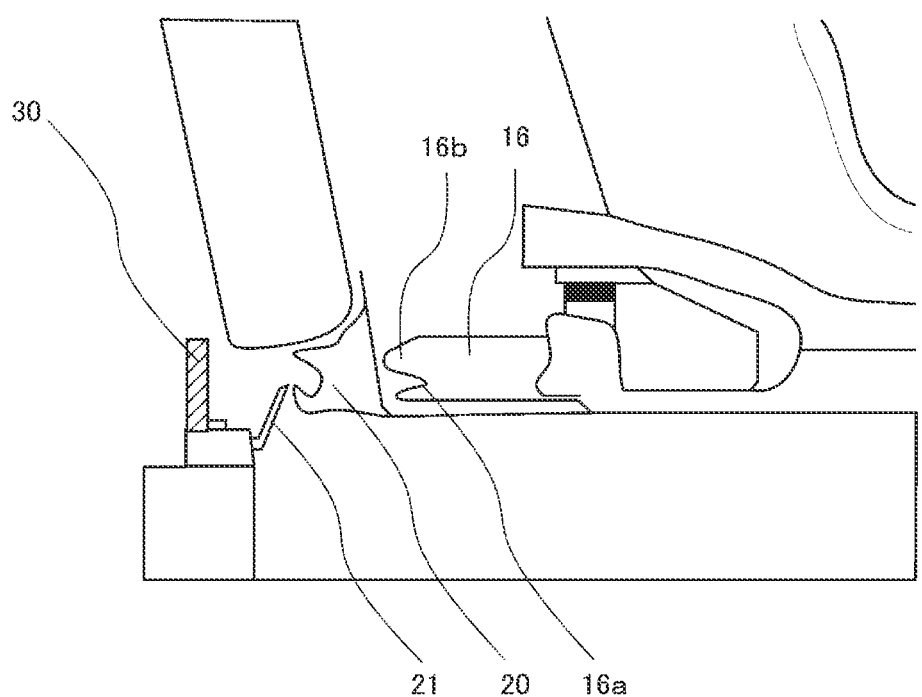
FIG. 3 is a view illustrating a power supply structure to the seat according to the embodiment of the disclosure.

As illustrated in FIG. 3, ISOFIX anchors 16 are provided at both ends in a vehicle width direction of a rear lower side of the child seat 10.

When the child seat 10 is slid to a vehicle rear side on a vehicle seat, each of the ISOFIX anchors 16 slides an arm guide 20 provided in a gap formed in a lower seat back and a rear end of the seating surface of the vehicle seat, and is locked by fitting a recess 16a formed in a tip end of each of the ISOFIX anchors 16 to an anchor 21 provided on a vehicle side.

When each of the ISOFIX anchors 16 slides to a lock position, an upper projection 16b thereof provided at the tip end comes into contact with an electrode 30 provided on the vehicle side.

In the electrode 30, a pair of an anode 30a and a cathode 30b is coupled to an anode or a cathode of a battery, respectively, and the electrode 30 supplies power to the ECU 14, the head sensors 11a and 11b, the chest sensors 12a and 12b, and the ischium sensors 13a and 13b.

The head sensors 11a and 11b, the chest sensors 12a and 12b, and the ischium sensors 13a and 13b are desirably rubber sensors, and short-distance wireless is desirably Bluetooth (registered trademark).

For example, when the shift position is the parking position based on the sensing signal from the shift sensor 300, an air conditioner is stopped, power is supplied from the ISOFIX, and a load is detected by the head sensors 11a and 11b, the chest sensors 12a and 12b, or the ischium sensors 13a and 13b, the child information detector 130 starts a detection process.

In addition, for example, when the shift position is the parking position based on the sensing signal from the shift sensor 300, the air conditioner is stopped, the power is supplied from the ISOFIX, and the load is not detected by the head sensors 11a and 11b, the chest sensors 12a and 12b, or the ischium sensors 13a and 13b, the child information detector 130 may execute the detection process for 15 minutes, and then stop the detection process.

In addition, for example, when the shift position is the parking position based on the sensing signal from the shift sensor 300, the air conditioner is stopped, the power is supplied from the ISOFIX, a detection process of gravity center movement is executed by the head sensors 11a and 11b, the chest sensors 12a and 12b, or the ischium sensors 13a and 13b for 5 minutes, and the gravity center movement cannot be detected, the child information detector 130 may stop the detection process after 15 minutes.

The temperature information acquisition unit 140 acquires temperature information in the vehicle cabin.

The temperature information acquisition unit 140 is, for example, a temperature sensor 600, and the acquired temperature information is output to the controller 170 to be described later via the bus line BL.

The vehicle surrounding information acquisition unit 150 acquires surrounding information on the vehicle.

The vehicle surrounding information acquisition unit 150 acquires, for example, the number of people around the vehicle, detailed map data of a parking place, and weather information such as an intensity of sunlight from an ADAS sensor 700.

The vehicle surrounding information acquisition unit 150 outputs a detection result to the controller 170 to be described later via the bus line BL.

When the child IF is left in the vehicle cabin, the notification unit 160 notifies the outside of the vehicle that leaving of the child IF has occurred.

Examples of a notification destination of the notification unit 160 include the outside of the vehicle including a mobile terminal 800 and an emergency notification center 900.

The notification unit 160 notifies the outside of the vehicle of a warning by voice, light, or the like.

When there is a person around the vehicle, the notification unit 160 executes voice notification or flashing notification according to an output timing of signals from the chest sensors 12a and 12b, for example, in the child information detector 130, that is, according to a heartbeat of the child IF.

The controller 170 controls an overall operation of the in-vehicle device 1 based on a control program stored in a random access memory (RAM) (not illustrated).

In the present embodiment, for example, when the vehicle is in the parking state, the controller 170 controls a notification mode of the notification unit 160 according to information including the temperature information in the vehicle cabin.

For example, when there is a person around the vehicle, the controller 170 controls the notification unit 160 to execute the voice notification or the flashing notification according to an output timing of signals from the seat sensors 500 detected by the child information detector 130.

For example, when the vehicle is in the parking state and the child IF is left in the vehicle cabin, and when there are many people around the vehicle, a temperature is high, and the sunlight is strong, the controller 170 changes the notification mode in order to increase a warning intensity of the notification unit 160.

For example, in the above case, the controller 170 controls the notification unit 160 to execute a warning by a hazard of the vehicle and a notification to the emergency notification center 900.

In addition, the controller 170 controls the notification unit 160 to execute the voice notification, the flashing notification, or the like according to the output timing of the signals from the chest sensors 12a and 12b, that is, according to the heartbeat of the child IF, to a mobile terminal that downloads a specific application, around the vehicle.

In addition, when there is no person around the vehicle, the controller 170 controls to decrease an operation threshold of the notification unit 160.

Processes of In-Vehicle Device 1

Figure 4:
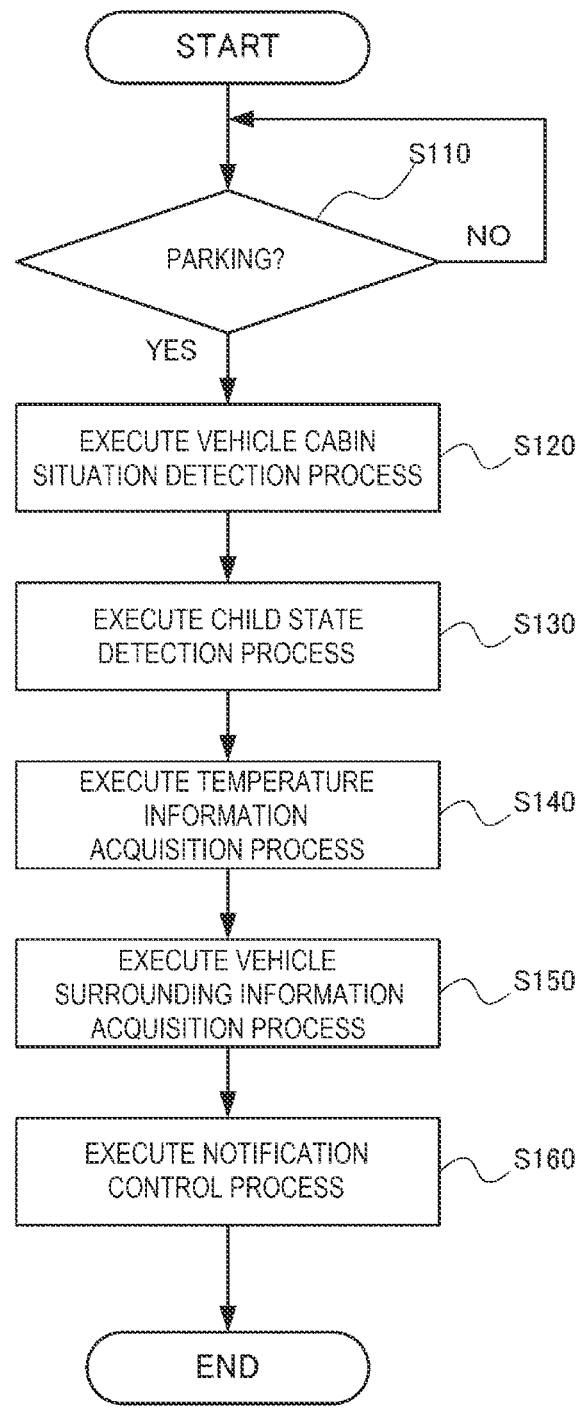
FIG. 4 is a process flowchart of the in-vehicle device according to the embodiment of the disclosure.

The processes of the in-vehicle device 1 according to the present embodiment will be described with reference to FIG. 4.

The parking state detector 110 detects whether the vehicle is in the parking state by detecting whether the shift position is the parking position based on the sensing signal from the shift sensor 300 (step S110).

When detection information indicating that the shift position is the parking position is not input from the parking state detector 110 ("NO" in step S110), the controller 170 returns the detection process to the original state and shifts to a standby mode.

On the other hand, when the detection information indicating that the shift position is the parking position is input from the parking state detector 110 ("YES" in step S110), the controller 170 executes a process of detecting a situation in the vehicle cabin based on information from the vehicle cabin situation detector 120 (step S120).

When the child seat 10 can be confirmed, but another occupant cannot be confirmed in the vehicle cabin by the vehicle cabin situation detection process, the controller 170 causes the child information detector 130 to operate to execute a child state detection process of detecting the presence of the child IF and position information on the child IF in the vehicle cabin based on the signals from the seat sensors 500 provided in the child seat 10 (step S130).

When the presence of the child IF and the position information on the child IF in the vehicle cabin are detected by the child state detection process, the controller 170 executes a temperature information acquisition process of acquiring the temperature information in the vehicle cabin by the temperature information acquisition unit 140 (step S140).

When the temperature information in the vehicle cabin is acquired by the temperature information acquisition process, the controller 170 executes a vehicle information acquisition process of acquiring the surrounding information on the vehicle by the vehicle surrounding information acquisition unit 150 (step S150).

For example, when the controller 170 determines that there is no person around the vehicle by the vehicle information acquisition process, the controller 170 instructs the notification unit 160 to notify the emergency notification center 900 and causes the notification unit 160 to execute the warning by the hazard of the vehicle.

On the other hand, for example, when the controller 170 determines that there is a person around the vehicle by the vehicle information acquisition process, the controller 170 causes the notification unit 160 to execute the voice notification, the flashing notification, or the like according to the output timing of the signals from the chest sensors 12a and 12b, that is, according to the heartbeat of the child IF, to the mobile terminal that downloads a specific application including a mobile terminal of an occupant, around the vehicle.

Operations and Effects

As described above, the in-vehicle device 1 according to the present embodiment includes: the parking state detector 110 that detects the parking state of the vehicle; the vehicle cabin situation detector 120 that detects the situation in the vehicle cabin; the child information detector 130 that detects the presence of the child IF and the position information on the child IF in the vehicle cabin based on the signals from the sensors 500 provided in the child seat 10; the temperature information acquisition unit 140 that acquires the temperature information in the vehicle cabin; the notification unit 160 that notifies the outside of the vehicle that the leaving of the child IF has occurred when the child IF is left in the vehicle cabin; and the controller 170 that controls the notification mode of the notification unit 160 according to the information including the temperature information in the vehicle cabin when the vehicle is in the parking state.

That is, the controller 170 grasps the situation in which the vehicle is in the parking state and the child IF is left in the vehicle cabin by the parking state detector 110, the vehicle cabin situation detector 120, and the child information detector 130.

Therefore, it is possible to quickly discover the presence of the child IF left in the vehicle cabin in the parked vehicle.

In addition, when the child IF is left in the vehicle cabin in the parked vehicle, the controller 170 controls the notification mode of the notification unit 160 according to the information including the temperature information in the vehicle cabin.

That is, when the child IF is left in the vehicle cabin in the parked vehicle, the controller 170 controls the notification mode of the notification unit 160 according to a degree of urgency of the situation.

Therefore, it is possible to provide an immediate emergency response to the child IF, and to ensure safety of the child IF.

The in-vehicle device 1 according to the present embodiment includes the vehicle surrounding information acquisition unit 150 that acquires the surrounding information on the vehicle, the seat sensors 500 are provided symmetrically on the inner sides of the seat back 10a and the seating surface 10b corresponding to at least the chest of the child IF in a state where the child IF is seated on the child seat 10, which are in contact with the child IF, the notification unit 160 notifies the warning by voice or light, and the controller 170 controls the voice notification or the flashing notification according to the output timing of the signals from the seat sensors 500 detected by the child information detector 130 when there is a person around the vehicle.

That is, the seat sensors 500 are provided symmetrically on the inner sides of surfaces in contact with the seat back 10a and the seating surface 10b with respect to at least the chest of the child IF in a state where the child IF is seated on the child seat 10.

Therefore, the heartbeat of the child IF can be captured intermittently.

When there is a person around the vehicle, the controller 170 controls the notification unit 160 to execute the voice notification or the flashing notification according to the output timing of the signals from the seat sensors 500 detected by the child information detector 130.

That is, when there is a person including an occupant around the vehicle, the controller 170 controls the notification unit 160 to execute the voice notification or the flashing notification according to a timing of the heartbeat of the child IF.

Therefore, it is possible to realistically notify a person including an occupant around the vehicle of a degree of urgency of a situation based on a frequency of the voice notification or the flashing notification and change in the frequency.

When there is no person around the vehicle, the controller 170 of the in-vehicle device 1 according to the present embodiment decreases the operation threshold of the notification unit 160.

Therefore, the best process can be performed before a situation requiring urgent attention to the child IF.

Second Embodiment

An in-vehicle device 1A according to a second embodiment of the disclosure will be described with reference to FIGS. 5 and 6.

Configuration of Processor 100A

Figure 5:
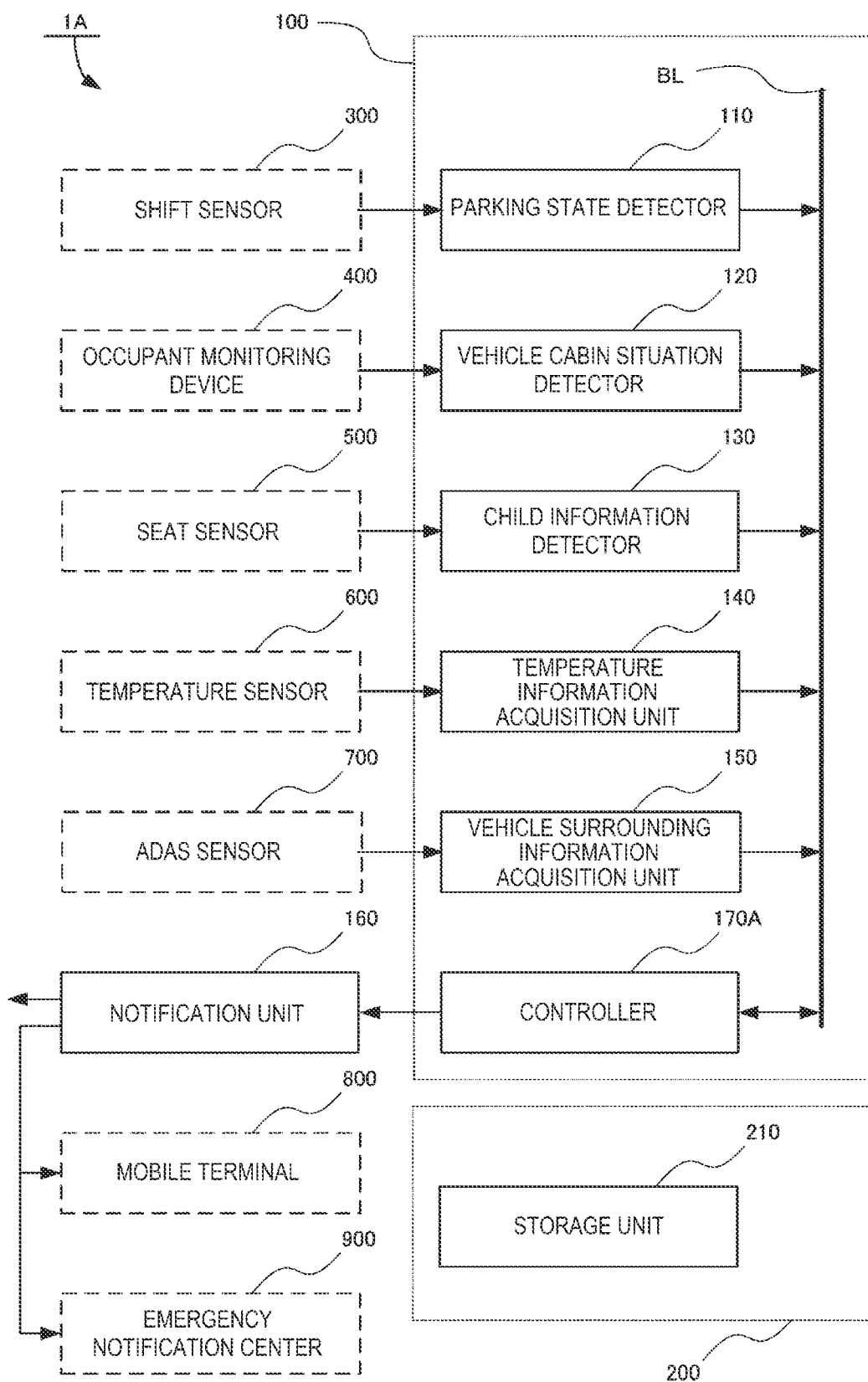
FIG. 5 is a diagram illustrating a configuration of an in-vehicle device according to an embodiment of the disclosure.
Figure 6:
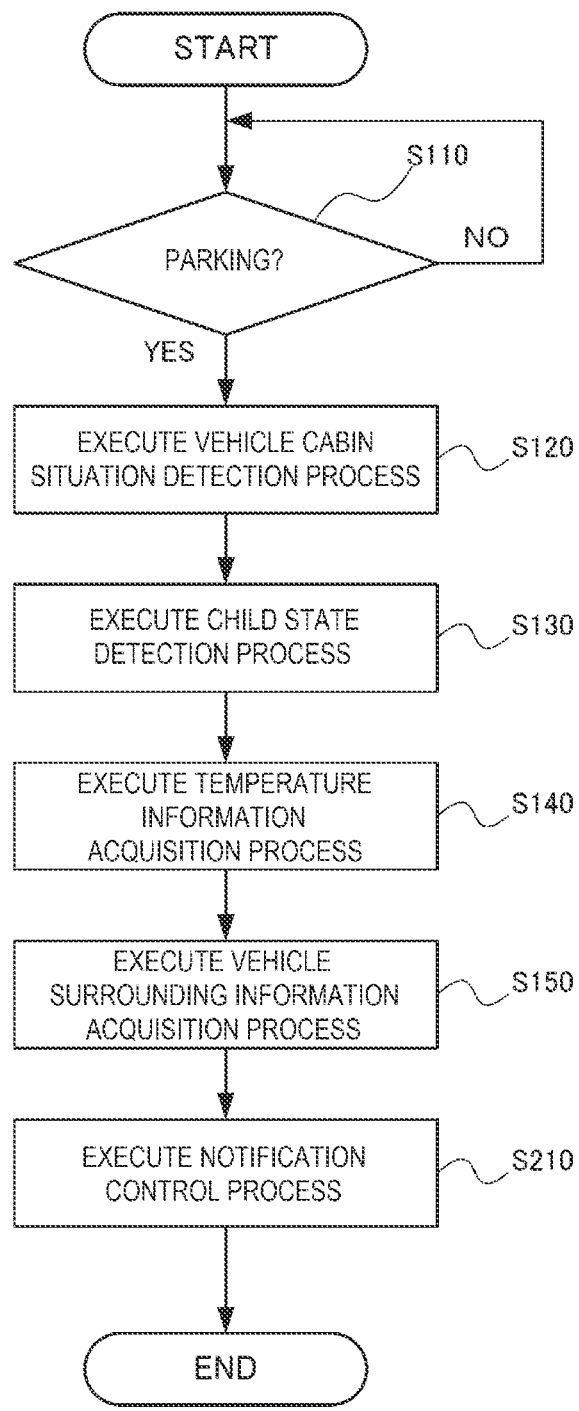
FIG. 6 is a process flowchart of the in-vehicle device according to the embodiment of the disclosure.

As illustrated in FIG. 5, a processor 100A of the in-vehicle device 1A according to the present embodiment includes the parking state detector 110, the vehicle cabin situation detector 120, the child information detector 130, the temperature information acquisition unit 140, the vehicle surrounding information acquisition unit 150, the notification unit 160, and a controller 170A.

Since components s denoted by the same reference numerals as those in the first embodiment have the same functions as those in the first embodiment, respectively, a detailed description thereof will be omitted.

The controller 170A controls an overall operation of the in-vehicle device 1A based on a control program stored in a random access memory (RAM) (not illustrated).

In the present embodiment, for example, when there is a person around the vehicle, the controller 170A causes the notification unit 160 to transmit voice such as crying voice to a mobile terminal around the vehicle.

For example, when the child IF is left in the vehicle cabin in the parked vehicle and a door is locked, the controller 170A causes the notification unit 160 to transmit the voice such as the crying voice of the child IF to the mobile terminal that downloads the specific application, around the vehicle, for 10 minutes from start of the door lock until the door lock is released.

In addition, when there is no person around the vehicle, the controller 170A controls to decrease the operation threshold of the notification unit 160.

Processes of In-Vehicle Device 1A

The processes of the in-vehicle device 1A according to the present embodiment will be described with reference to FIG. 6.

The parking state detector 110 detects whether the vehicle is in the parking state by detecting whether the shift position is the parking position based on the sensing signal from the shift sensor 300 (step S110).

When the detection information indicating that the shift position is the parking position is not input from the parking state detector 110 ("NO" in step S110), the controller 170A returns the detection process to the original state and shifts to a standby mode.

On the other hand, when the detection information indicating that the shift position is the parking position is input from the parking state detector 110 ("YES" in step S110), the controller 170A executes the process of detecting a situation in the vehicle cabin based on the information from the vehicle cabin situation detector 120 (step S120).

When the child seat 10 can be confirmed, but another occupant cannot be confirmed in the vehicle cabin by the vehicle cabin situation detection process, the controller 170A causes the child information detector 130 to operate to execute a child state detection process of detecting the presence of the child IF and the position information on the child IF in the vehicle cabin based on the signals from the seat sensors 500 provided in the child seat 10 (step S130).

When the presence of the child IF and the position information on the child IF in the vehicle cabin are detected by the child state detection process, the controller 170A executes the temperature information acquisition process of acquiring the temperature information in the vehicle cabin by the temperature information acquisition unit 140 (step S140).

When the temperature information in the vehicle cabin is acquired by the temperature information acquisition process, the controller 170A executes the vehicle information acquisition process of acquiring the surrounding information on the vehicle by the vehicle surrounding information acquisition unit 150 (step S150).

For example, when the controller 170A determines that there is no person around the vehicle by the vehicle information acquisition process, the controller 170A instructs the notification unit 160 to notify the emergency notification center 900 and causes the notification unit 160 to execute the warning by the hazard of the vehicle.

On the other hand, for example, when the controller 170A determines that there is a person around the vehicle by the vehicle information acquisition process, the controller 170A causes the notification unit 160 to transmit voice such as crying voice to the mobile terminal 800 around the vehicle.

Operations and Effects

As described above, when there is a person around the vehicle, the controller 170A of the in-vehicle device 1A according to the present embodiment causes the notification unit 160 to transmit voice such as crying voice to a mobile terminal around the vehicle.

That is, by making notification by the voice such as the crying voice instead of a simple electronic sound, a person carrying the mobile terminal 800 that downloads the specific application around the vehicle is made to think of a situation in which the child IF is placed.

Therefore, it is possible to quickly discover the child IF left in the parked vehicle, to provide an immediate emergency response, and to ensure safety of the child IF.

Third Embodiment

An in-vehicle device 1B according to a third embodiment of the disclosure will be described with reference to FIGS. 7 and 8.

Configuration of Processor 100B

Figure 7:
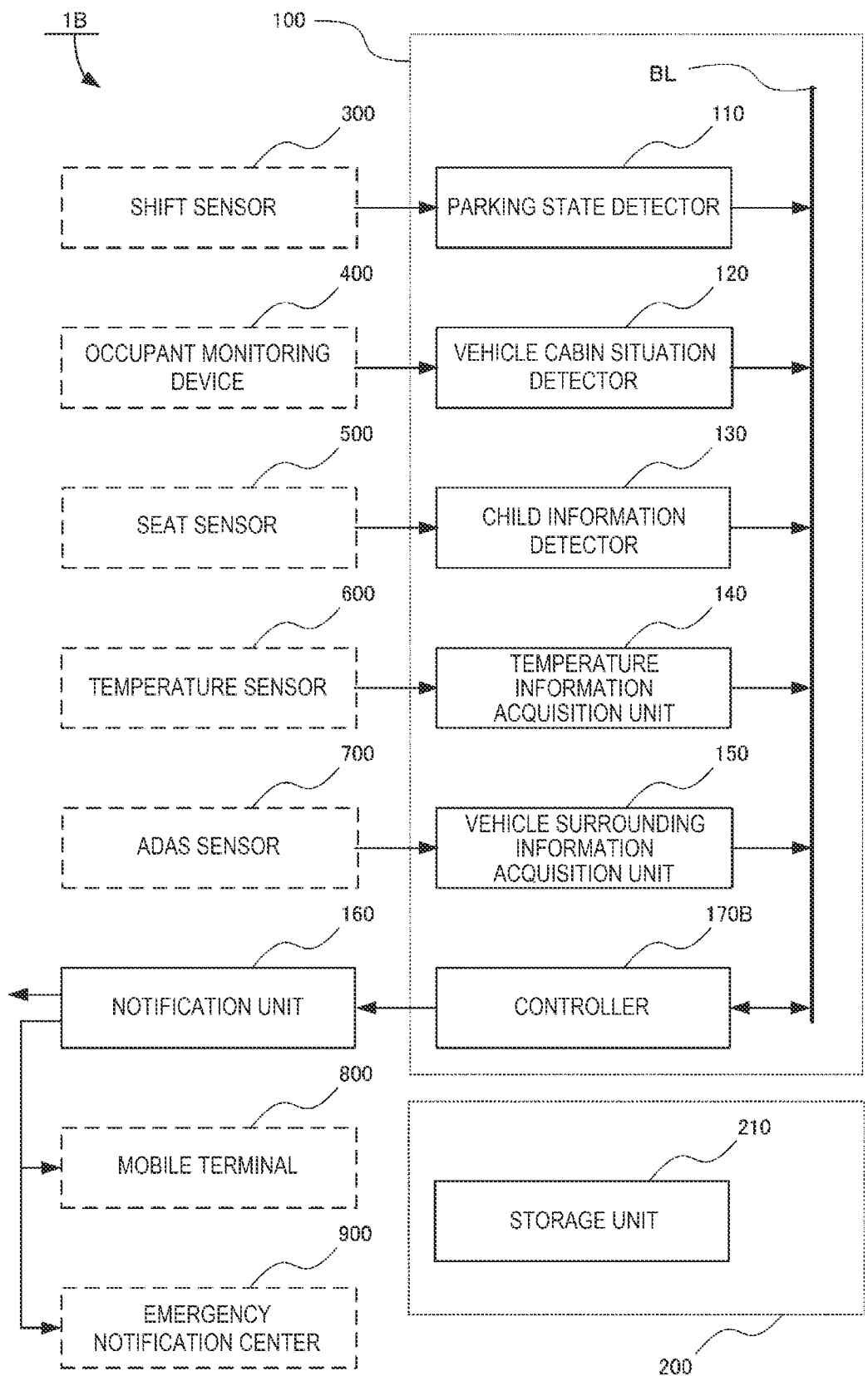
FIG. 7 is a diagram illustrating a configuration of an in-vehicle device according to an embodiment of the disclosure.
Figure 8:
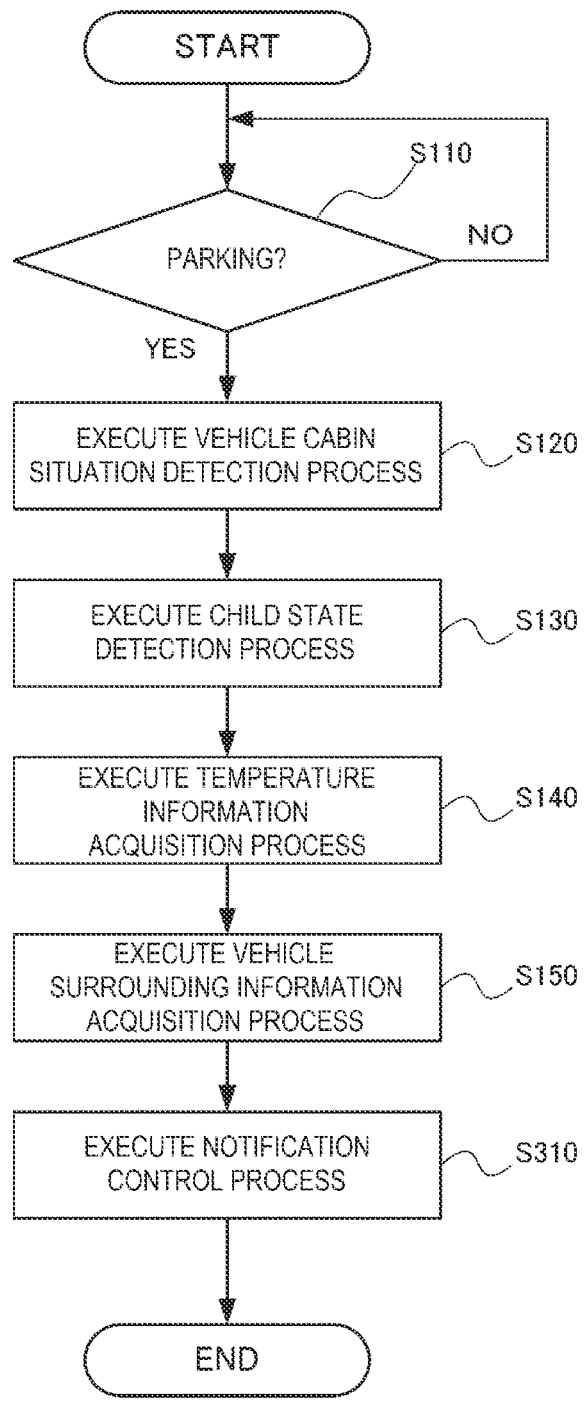
FIG. 8 is a process flowchart of the in-vehicle device according to the embodiment of the disclosure.

As illustrated in FIG. 7, a processor 100B of the in-vehicle device 1B according to the present embodiment includes the parking state detector 110, the vehicle cabin situation detector 120, the child information detector 130, the temperature information acquisition unit 140, the vehicle surrounding information acquisition unit 150, the notification unit 160, and a controller 170B.

Since components denoted by the same reference numerals as those in the first embodiment and the second embodiment have the same functions as those in the first embodiment and the second embodiment, respectively, a detailed description thereof will be omitted.

The controller 170B controls an overall operation of the in-vehicle device 1B based on a control program stored in a random access memory (RAM) (not illustrated).

In the present embodiment, for example, when the controller 170B determines that a situation requiring urgent attention to the child IF has occurred based on the information including the temperature information in the vehicle cabin, the controller 170B causes the notification unit 160 to execute abnormality notification by a social networking service (SNS).

For example, when the controller 170B determines that the child IF is left in the parked vehicle and a door is locked, the controller 170B causes the notification unit 160 to execute the abnormality notification by the SNS for the latest SNS reader for 15 minutes from start of the door lock until the SNS is already read.

In addition, when there is no person around the vehicle, the controller 170B controls to decrease the operation threshold of the notification unit 160.

Processes of In-Vehicle Device 1B

The processes of the in-vehicle device 1B according to the present embodiment will be described with reference to FIG. 8.

The parking state detector 110 detects whether the vehicle is in the parking state by detecting whether the shift position is the parking position based on the sensing signal from the shift sensor 300 (step S110).

When the detection information indicating that the shift position is the parking position is not input from the parking state detector 110 ("NO" in step S110), the controller 170B returns the detection process to the original state and shifts to a standby mode.

On the other hand, when the detection information indicating that the shift position is the parking position is input from the parking state detector 110 ("YES" in step S110), the controller 170B executes the process of detecting a situation in the vehicle cabin based on the information from the vehicle cabin situation detector 120 (step S120).

When the child seat 10 can be confirmed, but another occupant cannot be confirmed in the vehicle cabin by the vehicle cabin situation detection process, the controller 170B causes the child information detector 130 to operate to execute the child state detection process of detecting the presence of the child IF and the position information on the child IF in the vehicle cabin based on the signals from the seat sensors 500 provided in the child seat 10 (step S130).

When the presence of the child IF and the position information on the child IF in the vehicle cabin are detected by the child state detection process, the controller 170B executes the temperature information acquisition process of acquiring the temperature information in the vehicle cabin by the temperature information acquisition unit 140 (step S140).

When the temperature information in the vehicle cabin is acquired by the temperature information acquisition process, the controller 170B executes the vehicle information acquisition process of acquiring the surrounding information on the vehicle by surrounding information acquisition unit 150 (step S150).

For example, when the controller 170B determines that there is no person around the vehicle by the vehicle information acquisition process, the controller 170B instructs the notification unit 160 to notify the emergency notification center 900 and causes the notification unit 160 to execute the warning by the hazard of the vehicle.

On the other hand, for example, when the controller 170B determines that there is a person around the vehicle by the vehicle information acquisition process, the controller 170B causes the notification unit 160 to execute the abnormality notification by the SNS.

Operations and Effects

As described above, when the controller 170B of the in-vehicle device 1B according to the present embodiment determines that a situation requiring urgent attention to the child IF has occurred based on the information including the temperature information in the vehicle cabin, the controller 170B causes the notification unit 160 to execute the abnormality notification by the SNS.

That is, by executing the abnormality notification by the SNS, it is possible to cause the SNS reader to recognize that the child IF is in a situation requiring urgent attention, and to expect spread of information when the SNS reader is not around the vehicle.

Therefore, it is possible to quickly discover the child IF left in the parked vehicle, to provide an immediate emergency response, and to ensure safety of the child IF.

The in-vehicle devices 1, 1A, and 1B of the disclosure can be implemented by recording the processes of the processors 100, 100A, and 100B in a recording medium readable by a computer system and causing the processors 100, 100A, and 100B to read and execute a program recorded in the recording medium. As used herein, the computer system includes an OS and hardware such as a peripheral device.

The "computer system" also includes a homepage providing environment (or a display environment) when a world wide web (WWW) system is used. In addition, the program may be transmitted from a computer system having the program stored in a storage device or the like to another computer system via a transmission medium or by transmission waves in the transmission medium. Here, the "transmission medium" that transmits the program refers to a medium having a function of transmitting information, for example, a network (communication network) such as the Internet or a communication line (communication line) such as a telephone line.

The above program may implement a part of the above-described functions. Further, the above program may be a program, that is, a so-called difference file (difference program), capable of implementing the above-described functions in combination with a program already recorded on the computer system.

Although the embodiments of the present disclosure have been described in detail with reference to the drawings, specific configurations are not limited to the embodiments, and designs and the like within a range not departing from the gist of the present disclosure are also included.

The invention claimed is:

1. An in-vehicle device comprising:
   a parking state detector configured to detect a parking state of a vehicle;
   a vehicle cabin situation detector configured to detect a situation in a vehicle cabin of the vehicle;
   a child information detector configured to detect presence of a child and position information on the child in the vehicle cabin based on a signal from a seat sensor provided on a child seat in the vehicle cabin;
   a temperature information acquisition unit configured to acquire temperature information in the vehicle cabin;
   a notification unit configured to, when the child is left in the vehicle cabin, notify outside of the vehicle that leaving of the child has occurred;
   a controller configured to, when the vehicle is in the parking state, control a notification mode of the notification unit according to information including the temperature information in the vehicle cabin; and
   a vehicle surrounding information acquisition unit configured to acquire surrounding information on the vehicle, wherein
   the controller is configured to set a temperature for controlling the notification mode of the notification unit when the acquired surrounding information indicates that there is no person around the vehicle to be lower than a temperature for controlling the notification mode of the notification unit when the acquired surrounding information indicates that there is a person around the vehicle.

2. The in-vehicle device according to claim 1, wherein the vehicle surrounding information acquisition unit is configured to acquire surrounding information on the vehicle, wherein
   the controller is configured to control the notification mode of the notification unit according to whether there is a person around the vehicle.

3. The in-vehicle device according to claim 1, wherein the vehicle surrounding information acquisition unit is configured to acquire surrounding information on the vehicle, wherein
   the controller is configured to, when there is a person around the vehicle, cause the notification unit to transmit, to a mobile terminal around the vehicle, information notifying that the leaving has occurred.

4. The in-vehicle device according to claim 3, wherein, the controller is configured to, when determining that a situation requiring urgent attention to the child has occurred based on the information including the temperature information in the vehicle cabin, cause the notification unit to execute a notification notifying that the leaving has occurred through a social networking service.

5. An in-vehicle device comprising:
   one or more processors; and
   one or more memories communicably coupled to the one or more processors, wherein
   the one or more processors are configured to:
      detect a parking state of the vehicle;
      detect a situation in a vehicle cabin of a vehicle;
      detect presence of a child and position information on the child in the vehicle cabin based on a signal from a seat sensor provided on a child seat in the vehicle cabin;
      acquire temperature information in the vehicle cabin;
      cause a notification unit to notify, when the child is left in the vehicle cabin, outside of the vehicle that leaving of the child has occurred, the notification unit being configured to notify outside of a vehicle including an emergency notification center of a warning;
      control, when the vehicle is in the parking state, a notification mode of the notification unit according to information including the temperature information in the vehicle cabin;
      acquire surrounding information on the vehicle; and
      set a temperature for controlling the notification mode of the notification unit when the acquired surrounding information indicates that there is no person around the vehicle to be lower than a temperature for controlling the notification mode of the notification unit when the acquired surrounding information indicates that there is a person around the vehicle.

* * * * *